United States Patent [19]
Laing

[11] 3,741,690
[45] June 26, 1973

[54] SEPARATING WALL FOR MAGNETIC MACHINE

[76] Inventor: Nikolaus Laing, Hoefener Weg 35-37, 7141 Aldingen near Stuttgart, Germany

[22] Filed: Oct. 12, 1971

[21] Appl. No.: 188,565

[30] Foreign Application Priority Data
Oct. 13, 1970 Austria................................... 9220

[52] U.S. Cl..................... 417/420, 310/90, 310/166
[51] Int. Cl. ............................................ H02k 5/16
[58] Field of Search .................. 310/90, 91, 86, 87, 310/166, 193; 417/420; 415/54

[56] References Cited
UNITED STATES PATENTS

| | | | |
|---|---|---|---|
| 3,447,469 | 4/1926 | Laing................................ | 310/166 |
| 3,354,833 | 11/1967 | Laing................................ | 417/420 |
| 3,490,379 | 1/1970 | Laing................................ | 417/420 |
| 3,581,132 | 5/1971 | Laing................................ | 310/166 |

*Primary Examiner*—R. Skudy
*Attorney*—Robert McKay et al.

[57] ABSTRACT

Spherical pole ring magnetic couplings having a spherical bearing adapted to drive a centrifugal pump and resides in a construction in which a spherical hermetic wall separating the poles is so formed as to have a tubular column, surrounded by a concave pole ring. The column supports the bearing, so that overall length of the coupling is reduced.

6 Claims, 2 Drawing Figures

SEPARATING WALL FOR MAGNETIC MACHINE

DESCRIPTION OF THE PRIOR ART

Magnetic couplings with a spherical air gap have been disclosed in which the convex pole ring is supported by a spherical bearing and where the centers of a spherical air gap and of a spherical bearing coincide. In such couplings, the drive is performed by means of a motor on the output shaft end of which a concave pole ring is mounted. Such a coupling which is the type with which the invention is concerned, therefore comprises an externally driven spherically concave magnetic rotor exerting torque on a complementarily convex second rotor, there being an air gap between them in which is located a spherically shaped non-magnetic hermetic separating wall.

Such couplings are applied in particular to centrifugal pumps, which replace pumps with shaft seals. Such substitution compared with sealed shaft pumps leads to designs with longer axial lengths whereby the otherwise advantageous, hermetically sealed, magnetically coupled pumps exceed accepted dimensions of sealedshaft pumps.

SUMMARY OF THE INVENTION

The present invention provides a structure by which the overall axial length of a spherical pole ring magnetic coupling may be reduced over that of prior art couplings. According to the invention, the spherical bearing element of a pump impeller is arranged on a column of tubular construction which is rigid with a separating wall. According to the invention, the output shaft end of the motor and the hub of the concave pole ring protrude into the inside of the tubular column, so that the overall axial length is reduced by the length of what would normally be the motor shaft end. Thus the overall length of coupled pumps may be reduced: this offers the possibility of interchangeability with existing installations.

The invention is not confined to geometrically spherical separating walls, but may be applied to assemblies having magnetic couplings with dished separating walls which are cylindrical, or conical at the periphery.

The invention is also concerned with the constructional features of the separating wall, particularly such as to cope with high pressure differentials.

DESCRIPTION OF THE DRAWINGS

The invention will be described with the help of the accompanying drawings in which.

DETAILED DESCRIPTION OF THE PREFERRED EMBODIMENT

Figure 1:
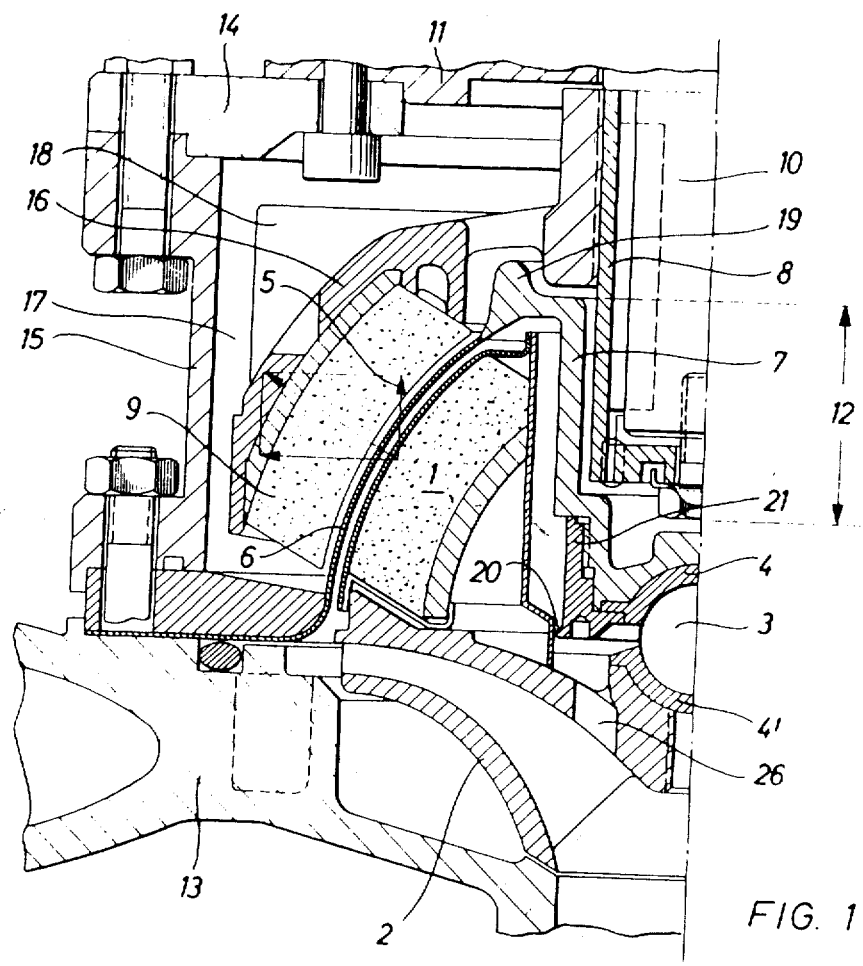
FIG. 1 is a sectional view of a magnetic coupling construction constructed according to the invention.

FIG. 1 shows an inner rotatable pole ring 1 which forms a subassembly unit with a centrifugal pump impeller 2. The ring 1 and impellor 2 are supported by means of a spherical bearing means comprising a ball 3 mounted between two cups 4/4' thus being able to resist the axial magnetic force acting between pole ring 1 and the outer pole ring 9 as component indicated by the arrow 5. A hermetic separating wall 6 forms a subassembly unit with a depressed centrally positioned tubular column 7. A hub 8 of the external pole ring 9, which forms the attachment of the pole ring 9 to the end 10 of the shaft of the driving electric motor the presence of which is indicated at 11, protrudes into the column 7. The hub 8 and end 10 of the shaft each comprise part of a drive means for the outer pole ring. A pump made in accordance with the invention is shortened by the dimension indicated at 12, compared with an arrangement having the hub 8 completely outside the profile of the separating wall 6. Thus, the impeller 2 is positioned as near to the motor 11 as in conventional pumps which have rotating shaft seals. An annular casing 15 connects with the pump casing 13 (which is in the example, a volute) and along with the motor flange 14 surrounds the driving pole ring 9. Ring 9 which is carried by a wheel disc 16 which, owing to its much larger diameter than that of the impeller, causes a very large increase in torque when liquid enters the space 17. The torque may be further increased by the vanes 18. In the circumstance of increased torque in relation to the normal torque, the motor may be protected by a protective switch, whereby it will instantly be switched off.

In order to withstand the substantial hoop stresses generated in the separating wall 6, the column 7 is provided with a thick bead at 19 formed by welding. The collar 20, which lies in the plane of rotation containing the center of the ball 3, resists axial pressure. The bearing cup 4 is held in the bearing column 7 by means of the threaded ring 21. One or more apertures 26 may be provided to give tool axis by the tightening or adjustment of the ring 21 As shown, the wall 6 is fixed with respect to the pump casing 13. Also in the structure shown, the center of the ball 3 coincides substantially with the subassembly unit comprising the inner pole 1 and impellor 2.

Figure 2:
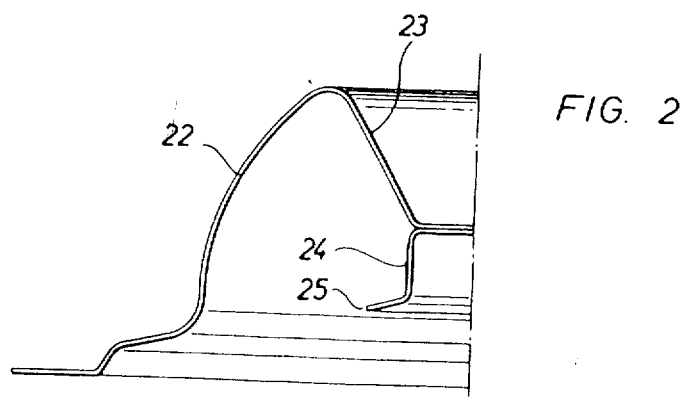
FIG. 2 is a sectional view of a modified form of a separating wall used in the structure of FIG. 1.

FIG. 2 shows a modified form of the separating wall 22 in which the tubular column takes the form of an inwardly extending conical shape which blends into the wall 22 at 23 by welds or other means. A dish-like element 24 is attached to the shape 23 and supports a bearing cup similar to 4, axial thrust of fluid pressure being resisted by the edge 25.

I claim:

1. A magnetic coupling device having a rotatable outer pole ring with a spherical concave surface, a rotatable inner pole ring with a spherical convex surface, said concave surface partially enclosing said convex surface and being spaced therefrom to form an air gap therebetween and drive means operatively connected to said outer pole ring; the improvement comprising including a hermetic separating wall in said air gap with said wall having a depressed centrally positioned tubular column for receiving said drive means, and spherical bearing means operatively positioned between said inner pole ring and the end of said tubular column for rotatably supporting said inner pole ring with respect to said outer pole ring.

2. A magnetic coupling device according to Claim 1 wherein the inner pole ring constitutes part of a subassembly of a pump impeller of a centrifugal pump having a casing, wherein said separating wall is fixedly positioned with respect to said casing, and wherein the center of gravity of said subassembly has its center at substantially the center of said bearing means.

3. A magnetic coupling device according to claim 2 having in addition a threaded ring on the end of said tubular column for securing said spherical bearing means thereto and having in addition apertures in said impeller by which access to said threaded ring may be obtained.

4. A magnetic coupling device according to claim 1 having in addition an annular bead in the region of the juncture of said tubular column with the separating wall to accommodate hoop stresses in the wall when the wall is subjected to pressure.

5. A magnetic coupling device according to claim 1 wherein the tubular column forms a blended continuation with the separating wall.

6. A magnetic coupling device according to claim 4 having in addition a dish-like element attached to the end of said tubular column for receiving said spherical bearing means.

* * * * *